June 13, 1967

B. C. SHARP 3,324,549

PRUNING SHEARS

Filed Aug. 6, 1965

INVENTOR
BERNARD C. SHARP

BY
ATTORNEY

United States Patent Office 3,324,549
Patented June 13, 1967

3,324,549
PRUNING SHEARS
Bernard C. Sharp, White Plains, N.Y., assignor to International Patent Research Corp., New York, N.Y., a corporation of New York
Filed Aug. 6, 1965, Ser. No. 477,874
16 Claims. (Cl. 30—181)

The present invention relates to a pruning shears construction.

Pruning shears are employed for the cutting of twigs, small branches, and other difficult-to-cut objects. They generally comprise two cutting elements, one a blade member and the other an anvil member in conjunction with which the blade member functions, the two members being moved toward and away from one another in order to sever an object placed between them. It is essential, if the blade and anvil members are to cooperate successfully, that their relative alignments be closely controlled during the cutting operation. For example, if the blade and anvil members laterally separate from one another, the object interposed between them may extend through the space between the members instead of being cleanly severed; the more the object to be severed resists cutting the greater are the forces tending to laterally separate the blade and anvil members, and the shears should be so constructed as to successfully resist such forces.

Because of the cooperative relationship between the blade and anvil members, which in their final position are preferably parallel with one another, and because strong and effective severing forces must be exerted on the object interposed between those members, it is conventional in pruning shears, as distinguished from the ordinary type of household paper-cutting shears, that a force-multiplying, and often relatively complex, linkage be interposed between the handles and one of the cutting members. This makes for added difficulty in ensuring the proper lateral alignment of those members as discussed in the preceding paragraph, and it further tends to make the shears function differently, because of differences in angular alignment between the cutting members, depending upon whether the object to be cut is located near the tips of the blade and anvil members or remote therefrom.

It is the prime object of the present invention to devise a pruning shears construction in which, by means of simple and inexpensive construction and arrangements, the functional effectiveness of the pruning shears is enhanced over that which has been feasible heretofore. More specifically, it is the aim of the present invention to more reliably ensure alignment of the blade and anvil members under various conditions of operation, and to make the operation of the shears equally effective no matter where along the cutting edges the object to be severed is located, while at the same time producing a strong and highly effective shearing action.

In accordance with the above, first and second relatively movable handles are provided. The anvil member is pivotally mounted on the first handle, and the blade member is carried by the second handle. The anvil member is also operatively connected to said second handle so as to be moved thereby, that operative connection comprising a pin carried by the second handle which is received in a cam slot on the anvil member, the cam slot being located rearwardly of the point where the anvil member is pivotally mounted on the first handle. The first handle is provided with depending laterally spaced skirt members between which, in substantially all of their operative positions, the said pin and the slotted portion of the anvil member are received with minimal lateral play. Means are also preferably provided for minimizing the degree to which lateral play is permitted between the pin and the slotted portion of the anvil member. Hence the skirt members and the parts received therebetween cooperate to resist lateral movement of the rear end of the anvil member, thereby to ensure proper lateral alignment of the anvil member relative to the blade member.

The cam slot-pin connection between the anvil member and the second handle (and possibly also the pivotal connection between the anvil member and the first handle) are provided with significant vertical clearance. The point of pivotal mounting of the anvil member on the first handle is disposed rearwardly of the tip of the anvil member but forwardly of the rear end of its operative cutting surface, and the pin-cam slot connection is located rearwardly of the said pivotal mounting on the first handle. As a result the vertical clearances permit a predetermined amount of tilting of the anvil member in the cutting plane, thereby to adapt to the location of the object to be cut along the length of the cutting edges and to produce substantially uniform and highly effective cutting action no matter where along those edges the object to be severed is located.

To the accomplishment of the above, and to such other objects as may hereinafter appear, the present invention relates to the construction of a pruning shears, as defined in the appended claims and as described in this specification, taken together with the accompanying drawings, in which:

Figure 1:
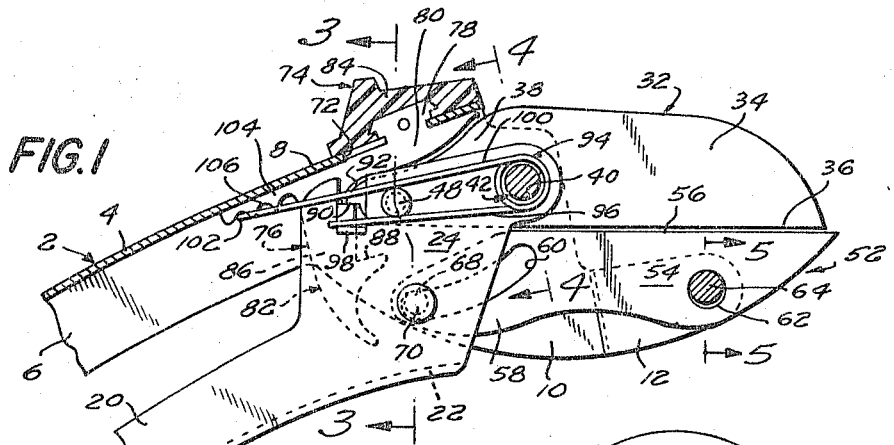
FIG. 1 is a side cross sectional view of the pruning shears of the present invention, the shears being shown in closed position.
Figure 3:
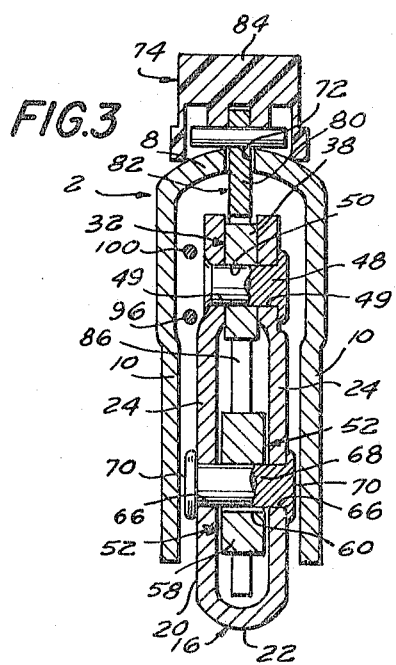
Figure 4:
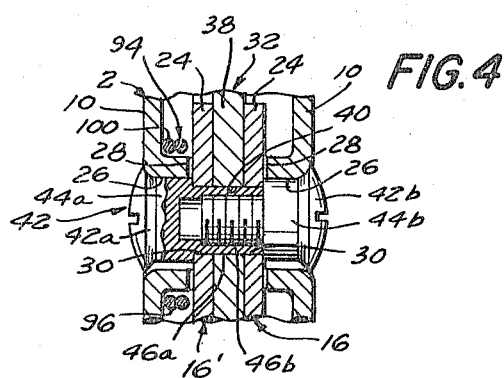
Figure 6:
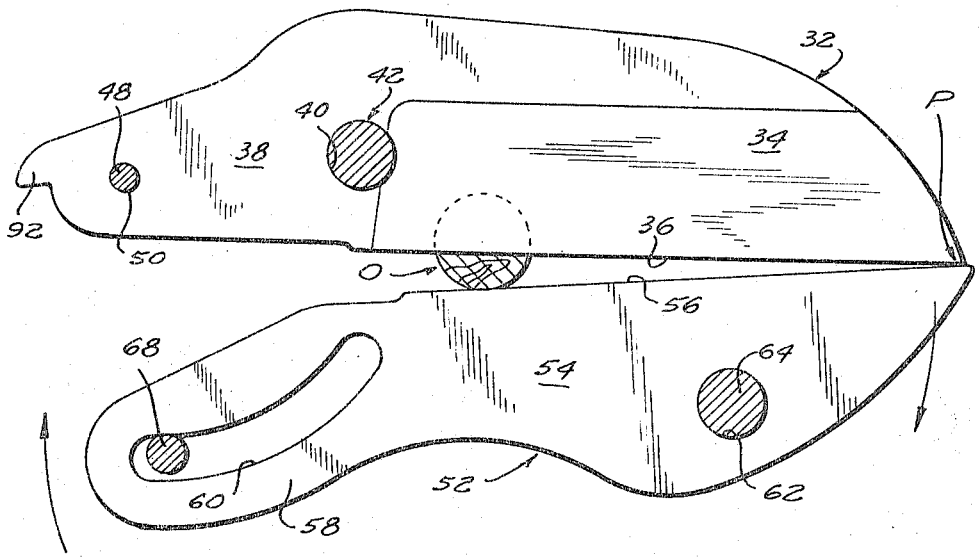
Figure 7:
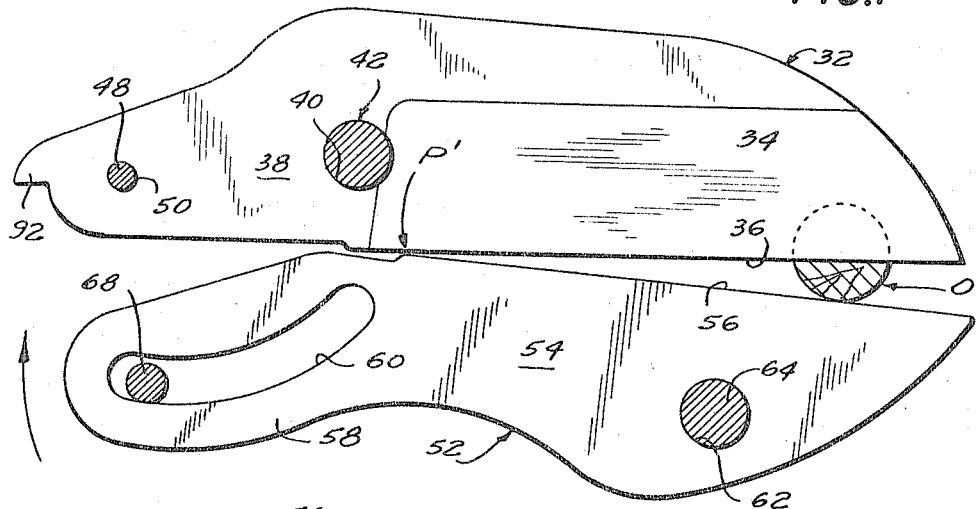
Figure 5:
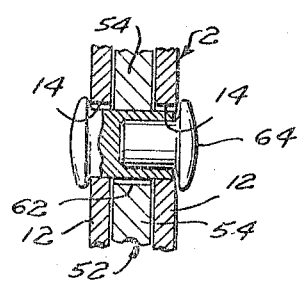

FIGS. 3, 4 and 5 are cross sectional views, on enlarged scales, taken along the lines 3—3, 4—4 and 5—5 respectively of FIG. 1; and FIGS. 6 and 7 are diagrammatic views illustrating the manner in which the vertical clearances involved in the mounting of the anvil member function to produce a uniform cutting action no matter where along the cutting edges the object to be severed is located, FIG. 6 illustrating that object as being located adjacent the inner ends of the cutting edges, and FIG. 7 illustrating that object located adjacent the tips or outer ends of the cutting edges.

The pruning shears comprises a first handle generally designated 2 having a rearwardly extending handle portion defined by top wall 4 and separated depending side walls 6. The forward portion of the handle 2 comprises a top wall 8 which is an integral extension of the top wall 4 and depending laterally spaced skirt members 10 which are integral extensions of the side walls 6. Extending forwardly from the skirt members 10, and laterally spaced from one another by a distance less than the spacing between the skirt members 10, are a pair of mounting parts 12 provided with registering apertures 14.

The second handle, generally designated 16, comprises a rearwardly extending handle portion defined by bottom wall 18 and side walls 20. The forward portion of the second handle 16 comprises a bottom wall 22 which is an integral extension of the bottom wall 18 and upstanding laterally spaced side walls 24 which are integral extensions of the side walls 20. The lateral spacing between the side walls 24 is less than that between the skirt members 10 forming a part of the first handle 2, and the side walls 24 of the second handle 16 are received between the skirt members 10. Those skirt members 10, adjacent their upper forward corners, are provided with apertures 26 defined by inturned flange portions terminating in opposed edges 28, the edges 28 being spaced from one another by a distance closely the same as the distance between the outer surfaces of the side walls 24 of the second handle received therebetween. Those side walls 24 are provided with apertures 30 which register with one another with the apertures 26 in the skirt members 10.

A blade member, generally designated 32, is carried by and extends outwardly beyond the second handle 16. The blade member 32 comprises a body portion 34 having a lower cutting edge 36 and a rearwardly extending tail portion 38. Its tail portion 38 is received between the side walls 24 of the second handle 16 and is provided with an aperture 40 which registers with the apertures 30 in the walls 24. A pin, generally designated 42, is designed to be passed through the registering apertures 26, 30, and 40, thereby to pivotally mount the second handle 16 on the first handle 2 and to assist in securing the blade member 32 to the second handle 16. In the form here specifically disclosed (see FIG. 4) the pin 42 is in two parts 42A and 42B, each part having an axial outer portion 44A and 44B respectively, which is larger in diameter than its inner portion 46A and 46B respectively, the apertures 26 in the skirt members 10 being of a size to snugly receive the outer portions 44A and 44B, the apertures 30 and 40 in the second handle side walls 24 and the blade member tail portion 38 respectively being smaller than the apertures 26 and snugly receiving the inner and female portion 46A of the pin part 42A, the inner and male portion 46B of the pin part 44B being threadedly received within said female portion 46A. A second pin 48 is carried by the side walls 24 of the second handle, snugly passing through apertures 49 formed in those walls. The pin 48 also snugly passes through an aperture 50 formed near the rear end of the tail portion 38 of the blade member 32, thereby rigidly mounting the blade member 32 on the second handle 16, so that as the second handle 16 pivots about the pin 42 the blade member 32 will likewise pivot thereabout.

The anvil member, generally designated 52, comprises a body portion 54 having an operative edge 56 adapted to oppose and cooperate with the cutting edge 38 of the blade member 32. Extending rearwardly from the body portion 54 is a tail portion 58 provided with a cam slot 60. The anvil member 52 is received between the mounting members 12 extending forwardly from the skirt members 10 of the first handle 2, and its tail portion is received between the walls 24 of the second handle 16. The anvil body 54, at a point between and below the extremities of its operative edge 56, is provided with an aperture 62 which registers with the apertures 14 formed in the mounting part 12. A pin 64 passes through the apertures 14 and 62, thereby pivotally mounting the anvil member 52 on the mounting parts 12. As may clearly be seen from FIG. 5, there is preferably an appreciable amount of vertical clearance between the pin 64 and the apertures 14 and 62.

As has been mentioned, the tail portion 58 of the anvil member 52 is received, preferably with only a minimal lateral clearance, between the side walls 24. Those side walls 24 are provided with registering apertures 66 which line up with the cam slot 60 in the tail portion 58 of the anvil 52, and a pin 68 passes through the apertures 60 and 66 and is headed over at both ends, as indicated at 70 in FIG. 3, so that there is no appreciable lateral play between the pin 68 and the side walls 24. Moreover, as may be seen from FIG. 3, the headed over portions 70 of the pin 60 are relatively snugly received between the depending skirt portions 10.

Thus, the degree to which the pin 68, the wall portions 24 of the second handle 16, and the tail portion 58 of the anvil member 52, can move laterally is greatly limited. The body portion 54 of the anvil member 52 is essentially snugly received between the mounting parts 12 (see FIG. 5). Hence the lateral orientation and positioning of the anvil member 52 is closely controlled. The blade member 34 is essentially rigid with the walls 24 of the second handle 16, the lateral position of the blade member 34 is limited, at the mounting axis defined by the pin 42, by the flange edges 28 (see FIG. 4) and lateral movement of the second handle walls 24, which carry the rear end of the tail portion 38 of the blade member 32, is limited by the pin 68 and the skirt members 10. Hence the lateral alignment between the blade member 34 and the anvil member 52 is closely controlled in all operative positions of the parts.

The upper wall 8 is provided with an elongated slot 72, and a lock means generally designated 74 is associated therewith, that lock means comprising the lock member generally designated 76 which has a first part 78 which extends above the upper surface of the wall 8, a second part 80 which extends through and is movable along the slot 72, and a third part 82 which extends below the wall 8. An operating button 84 may be secured to the lock member part 78 to facilitate manipulation thereof, the button 84 sliding over the upper surface of the wall 8. The third part 82 of the lock member 74 includes a depending element 86 having a pair of upwardly facing and upwardly and laterally displaced stop surfaces 88 and 90, adapted to be engaged by a rearwardly extending nose 92 on the tail portion 38 of the blade member 32. A spring 94 has a first arm 96 which presses downwardly on lug 98 forming a part of and struck inwardly from a wall portion 24 of the second handle 16, and a second arm 100 provided with a laterally extending finger 102 which extends beneath and forces up the undersurface of a rearwardly extending tail portion 104 of the lock member part 82, that under surface being provided with a plurality of indexing recesses 106.

Figure 2:
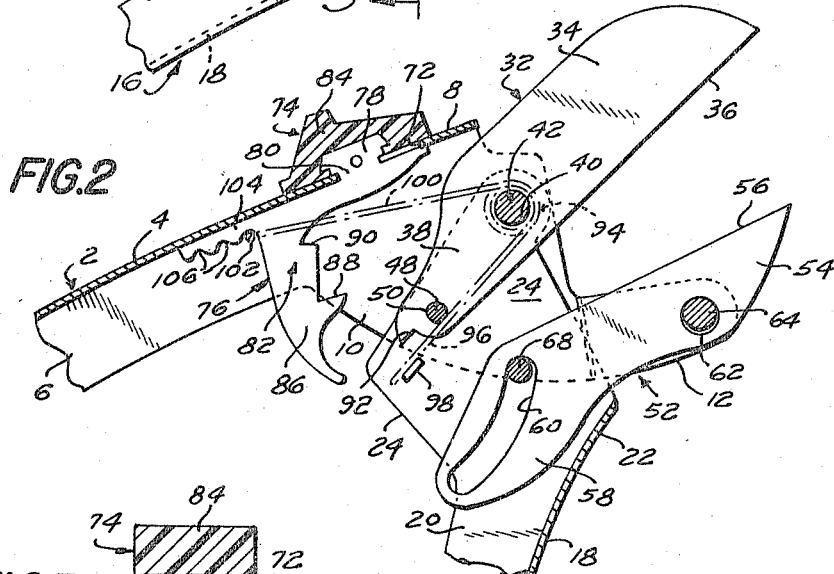
FIG. 2 is a view similar to FIG. 1, but with the shears shown in open position.

Thus the spring 94 acts on the second handle 16 through the lug 98 and on the first handle 2 through the portion 104 of the lock member part 82 to urge those handles apart, thereby urging the blade 32 and the anvil member 52 apart, to the position shown in FIG. 2. When the handles 2 and 16 are grasped and pulled together against the action of the spring 94, the blade 32 and anvil member 52 are moved together to closed position, thereby cutting anything located therebetween. When the handles 2 and 16 are close to one another the operator, by using his thumb, can push the button 84 of the locking means 74 forwardly to the position shown in FIG. 1, the stop surface 90 on the locking member part 82 thus being interposed beneath the rearwardly extending nose 52 of the blade 32 fixed to the second handle 16 and locking the handles and blades in closed position. The action of the finger 102 carried by the spring arm 100, which is resiliently urged into the rearmost recesses 106, serves to hold the locking means 74 in its locking position.

If it is desired to permit the blades to open part way, the button 84 is pulled back part way until the finger 102 carried by the spring arm 100 snaps into the intermediate recess 106, at which time the stop surface 88 will engage the nose portion 92 carried by the blade member 32. When it is desired that the blades open to their fullest extent, the button 84 is pulled back until the spring-carried finger 102 snaps into the forwardmost recess 106, at which time the lock member part 82 is located completely behind, and out of engagement with, the nose 92 on the blade member 32 (see FIG. 2). The structure and operation of this locking arrangement forms no part of the present invention, but is described and claimed in the previously filed application of Ho Chow, Ser. No. 458,317, filed May 24, 1965, entitled, "Shears With Locking Means," and assigned to the assignee of this application.

The part played by the vertical clearances between (a) the pin 64 and the apertures 14 and 62, (b) the pin 68 and the cam slot 60 in producing effective and uniform cutting action no matter where along the cutting edges 36 and 56 the object to be cut is located is illustrated schematically in FIGS. 6 and 7. In these figures, for clarity of explanation, all of the vertical clearances is shown as existing between the pin 68 and the cam slot 60. It will be understood, however, that in actual practice vertical clearances can exist at either or at both of the areas mentioned. In one embodiment a .007 inch vertical clearance is provided between pin 68 and its associated apertures 14 and 62, while as much as .022 inch vertical clearance is provided between the pin 68 and the cam slot 60. In order to achieve the effects described below to an appreciable extent, the accumulated vertical clearances at the areas under discussion, subject to normal manufacturing tolerances, should be at least .015 inch.

In FIGS. 6 and 7 the object to be cut is illustrated as a wooden branchlet of appreciable diameter, and is designated by the reference letter O. In FIG. 6 the object O is located close to the left hand ends of the cutting edges 36 and 56, and is therefore positioned to the left of pin 64, and laterally between that pin and the cam slot 60. In FIG. 7 the object O is located near the tips of the edges 36 and 56 to the right of the pin 64, the pin 64 therefore being interposed laterally between the object O and the cam slot 60. Because of the vertical clearances in question, the vertical or rotative orientation of the anvil member 52 about the pin 64 can vary, with the pin 68 engaging either the upper or the lower surface of the cam slot 60.

If the object O is in the position shown in FIG. 6, as the handles 2 and 16 are moved toward one another, thus causing the blade member 32 and the anvil member 52 to move toward one another, the cutting surfaces 36 and 56, when they engage the object O, will cause the anvil member 52 to pivot in a counterclockwise direction about the pin 64, the pin 68 engaging the upper surface of the cam slot 60. When the blade member 32 and anvil member 52 are moved close enough together, their edges 36 and 56 will engage near their tips, at the point designated P in FIG. 6. The engagement of the edges 36 and 56 at point P constitutes a pivot point about which the anvil member 52 is moved as the pin 68 slides along the upper surface of the cam slot 60, the anvil member 52 thus pivoting up to bring its edge 56 into parallel relationship with the blade edge 36, thereby firmly and reliably severing the object O.

When the object O is located in the position shown in FIG. 7 its action on the anvil member 52 will cause that member to pivot in a clockwise direction about the pin 64, and when the blade member 32 and anvil member 52 are close enough to one another their mating edges 36 and 56 will engage at the point P' shown in FIG. 7, the pin 68 sliding along the lower surface of the cam slot 60. As the handles 2 and 16 are moved further toward one another the anvil member 52 will be caused to pivot in a counter clockwise direction about the pin 64 until its cutting edge 56 is parallel with the cutting edge 36 of the blade member 32, thereby again firmly and reliably severing the object O. Thus, the pivoting action of the anvil member 52 is permitted to function in a substantially similar fashion for virtually all positions of the object O along the edges 36 and 56 by virtue of the vertical clearances provided for that purpose between the pin 64 and the apertures 14 and 62, and between the pin 68 and the cam slot 60.

The entire structure (except for the blade member 32 and anvil member 52) may be inexpensively made from sheet metal stock, the parts may be readily assembled, and when they are assembled they produce a pruning shears in which the alignment in all directions between the blade member 32 and the anvil member 52 is reliably assured, and in which a strong and effective cutting action is produced.

While but a single embodiment of the present invention has been here specifically disclosed, it will be apparent that many variations may be made therein, all within the scope of the invention as defined in the following claims.

I claim:

1. A pruning shears comprising a first handle having a forward portion comprising depending laterally spaced skirt members and a mounting part extending forwardly beyond said skirt members, a second handle having a forward portion received between said skirt members, said second handle being pivotally connected to said first handle and carrying a blade member which extend beyond said handles, an anvil member cooperating with said blade member, said anvil member being pivotally mounted on said mounting part and having a portion extending rearwardly alongside said second handle between said skirt members, said anvil portion having a cam slot, and a pin passing through said cam slot and carried by said second handle, said pin being located between said skirt members and extending substantially up to the inner surfaces of both of said skirt members, whereby said skirt members, acting via said pin, aid in laterally aligning said anvil member with said blade member.

2. The shears of claim 1, in which said pin, said second handle, and said anvil member are assembled with substantially no lateral play between them.

3. The shears of claim 1, in which said forward portion of said second handle comprises a pair of laterally spaced walls between which said slotted anvil portion is essentially snugly received, said pin passing through and extending beyond both of said second handle walls and engaging said walls in a manner to essentially prevent lateral movement of said pin relative to said walls.

4. The shears of claim 3, in which said anvil member is located beneath said blade member, said cam slot in said anvil member portion having a vertical dimension greater by a given amount than the vertical dimension of said pin, said anvil member having an opening, a second pin carried by said mounting part and passing through said opening, said second pin and said opening being located forwardly of said pin carried by said second handle and beneath the forward portion of said blade member and comprising the means pivotally mounting said anvil member on said mounting part, said pin having a vertical clearance in said opening, said clearance plus said given amount being at least as great as .015 inch.

5. The shears of claim 1, in which said anvil member is located beneath said blade member, said cam slot in said anvil member portion having a vertical dimension greater by a given amount than the vertical dimension of said pin, said anvil member having an opening, a second pin carried by said mounting part and passing through said opening, said second pin and said opening being located forwardly of said pin carried by said second handle and beneath the forward portion of said blade member and comprising the means pivotally mounting said anvil member on said mounting part, said pin having a vertical clearance in said opening, said clearance plus said given amount being at least as great as .015 inch.

6. A pruning shears comprising a first handle having a forward portion comprising depending laterally spaced skirt members and mounting parts extending forwardly from said skirt members respectively and laterally spaced from one another, a second handle having a forward portion received between said skirt members, said second handle being pivotally connected to said first handle and carrying a blade member which extends beyond said handles, an anvil member cooperating with said blade member, said anvil member being pivotally mounted between said mounting parts and having a portion extending rearwardly alongside said second handle between said skirt members, said anvil portion having a cam slot, and a pin passing through said cam slot and carried by said second handle, said pin being located between said skirt members and extending substantially up to the inner surfaces of both of said skirt members, whereby said skirt members, acting via said pin, aid in laterally aligning said anvil member with said blade member.

7. The shears of claim 6, in which said pin, said second handle, and said anvil member are assembled with substantially no lateral play between them.

8. The shears of claim 6, in which said forward portion of said second handle comprises a pair of laterally spaced walls between which said slotted anvil portion is essentially snugly received, said pin passing through and extending beyond both of said second handle walls and engaging said walls in a manner to essentially prevent lateral movement of said pin relative to said walls.

9. The shears of claim 8, in which said anvil member is located beneath said blade member, said cam slot in said anvil member portion having a vertical dimension greater by a given amount than the vertical dimension of said pin, said anvil member having an opening, a second pin carried by said mounting parts and passing through said opening, said second pin and said opening being located forwardly of said pin carried by said second handle and beneath the forward portion of said blade member and comprising the means pivotally mounting said anvil member on said mounting parts, said pin having a vertical clearance in said opening, said clearance plus said given amount being at least as great as .015 inch.

10. The shears of claim 6, in which said anvil member is located beneath said blade member, said cam slot in said anvil member portion having a vertical dimension greater by a given amount than the vertical dimension of said pin, said anvil member having an opening, a second pin carried by said mounting parts and passing through said opening, said second pin and said opening being located forwardly of said pin carried by said second handle and beneath the forward portion of said blade member and comprising the means pivotally mounting said anvil member on said parts, said pin having a vertical clearance in said opening, said clearance plus said given amount being at least as great as .015 inch.

11. A pruning shears comprising a first handle having a forward portion comprising depending laterally spaced skirt members and mounting parts extending forwardly from said skirt members respectively and laterally spaced from one another by a distance less than that between said skirt members, a second handle having a forward portion received between said skirt members, said second handle being pivotally connected to said first handle and carrying a blade member which extends beyond said handles, an anvil member cooperating with said blade member, said anvil member being pivotally mounted between said mounting parts and having a portion extending rearwardly alongside said second handle between said skirt members, said anvil portion having a cam slot, and a pin passing through said cam slot and carried by said second handle, said pin being located between said skirt members and extending substantially up to the inner surfaces of both of said skirt members, whereby said skirt members, acting via said pin, aid in laterally aligning said anvil member with said blade member.

12. The shears of claim 11, in which said pin, said second handle, and said anvil member are assembled with substantially no lateral play between them.

13. The shears of claim 11, in which said forward portion of said second handle comprises a pair of laterally spaced walls between which said slotted anvil portion is essentially snugly received, said pin passing through and extending beyond both of said second handle walls and engaging said walls in a manner to essentially prevent lateral movement of said pin relative to said walls.

14. The shears of claim 13, in which said anvil member is located beneath said blade member, said cam slot in said anvil member portion having a vertical dimension greater by a given amount than the vertical dimension of said pin, said anvil member having an opening, a second pin carried by said mounting parts and passing through said opening, said second pin and said opening being located forwardly of said pin carried by said second handle and beneath the forward portion of said blade member and comprising the means pivotally mounting said anvil member on said mounting parts, said pin having a vertical clearance in said opening, said clearance plus said given amount being at least as great as .015 inch.

15. The shears of claim 11, in which said anvil member is located beneath said blade member, said cam slot in said anvil member portion having a vertical dimension greater by a given amount than the vertical dimension of said pin, said anvil member having an opening, a second pin carried by said mounting parts and passing through said opening, said second pin and said opening being located forwardly of said pin carried by said second handle and beneath the forward portion of said blade member and comprising the means pivotally mounting said anvil member on said mounting parts, said pin having a vertical clearance in said opening, said clearance plus said given amount being at least as great as .015 inch.

16. A pruning shears comprising a first handle having a forward portion with a mounting part extending forwardly therefrom, a second handle having a forward portion pivotally connected to said forward portion of said first handle and carrying a blade member which extends beyond said handles above and forwardly beyond said mounting part, an anvil member positioned beneath and cooperating with said blade member, said anvil member being pivotally mounted on and extending forwardly beyond said mounting part and having a portion extending rearwardly alongside said second handle and there being provided with a cam slot, and a pin carried by said second handle and passing through said slot, said slot having a vertical dimension greater by a given amount than the vertical dimension of said pin, said anvil member having an opening, a second pin carried by said mounting part and passing through said opening, said second pin and said opening being located forwardly of said pin carried by said second handle and beneath the forward portion of said blade member and comprising the means pivotally mounting said anvil member on said mounting part, said pin having a vertical clearance in said opening, said clearance plus said given amount being at least as great as .015 inch.

References Cited
UNITED STATES PATENTS 2,508,790   5/1950   Herr _____ 30—181

FOREIGN PATENTS 930,390   7/1963   Great Britain.

WILLIAM FELDMAN, *Primary Examiner.*

JIMMY C. PETERS, *Assistant Examiner.*